US010156635B2

(12) United States Patent
Sorenson

(10) Patent No.: US 10,156,635 B2
(45) Date of Patent: Dec. 18, 2018

(54) OVERHEAD OBJECT DETECTION USING OPTICAL MEASUREMENTS

(71) Applicant: STARFISH NETWORK, INC., South Jordan, UT (US)

(72) Inventor: Randall D. Sorenson, Sandy, UT (US)

(73) Assignee: STARFISH NETWORK, INC., South Jordan, UT (US)

( * ) Notice: Subject to any disclaimer, the term of this patent is extended or adjusted under 35 U.S.C. 154(b) by 300 days.

(21) Appl. No.: 15/147,748

(22) Filed: May 5, 2016

(65) Prior Publication Data

US 2016/0356594 A1 Dec. 8, 2016

Related U.S. Application Data

(60) Provisional application No. 62/171,854, filed on Jun. 5, 2015.

(51) Int. Cl.
| | |
|---|---|
| *G01S 17/93* | (2006.01) |
| *G01S 17/42* | (2006.01) |
| *G01B 11/06* | (2006.01) |
| *G01S 17/10* | (2006.01) |
| *G08G 1/16* | (2006.01) |
| *G01S 13/93* | (2006.01) |

(52) U.S. Cl.
CPC .......... *G01S 17/93* (2013.01); *G01B 11/0608* (2013.01); *G01S 17/10* (2013.01); *G01S 17/42* (2013.01); *G01S 17/936* (2013.01); *G08G 1/161* (2013.01); *G08G 1/165* (2013.01); *G01S 2013/936* (2013.01)

(58) Field of Classification Search
CPC ............. G06K 9/00798; G06K 9/6293; G06K 9/00805; B60W 2420/42
See application file for complete search history.

(56) References Cited

U.S. PATENT DOCUMENTS

| | | | | |
|---|---|---|---|---|
| 5,389,912 A | * | 2/1995 | Arvin | B60Q 1/52 116/67 R |
| 5,710,553 A | | 1/1998 | Soares | |
| 6,088,116 A | * | 7/2000 | Pfanstiehl | G01N 21/8803 356/445 |
| 7,027,615 B2 | | 4/2006 | Chen | |
| 7,089,114 B1 | | 8/2006 | Huang | |
| 7,688,187 B2 | | 3/2010 | Caird et al. | |
| 8,212,660 B2 | | 7/2012 | Nugent | |

(Continued)

*Primary Examiner* — Luke D Ratcliffe
(74) *Attorney, Agent, or Firm* — Thorpe North & Western

(57) ABSTRACT

Technology is described for a height pole detection system for detecting a height of an overhead object from a moving vehicle. The height pole detection system can include a laser operable to emit a plurality of laser light pulses substantially upwards. The height pole detection system can include a laser light detector operable to detect one or more of the plurality of laser light pulses that are emitted from the laser and subsequently reflected from the overhead object. The height pole detection system can include an ambient light filter enclosure operable to partially surround the laser light detector. The ambient light filter enclosure can include an optical absorbing material for absorbing ambient light that is not reflected from the overhead object. The height pole detection system can enable detection of the height of the overhead objects based on a time of flight of detected laser light pulses.

19 Claims, 7 Drawing Sheets

(56) References Cited

U.S. PATENT DOCUMENTS

| 2004/0183661 A1* | 9/2004 | Bowman | G08G 1/165 |
| | | | 340/435 |
| 2010/0121577 A1* | 5/2010 | Zhang | G06K 9/00798 |
| | | | 701/301 |
| 2014/0336935 A1* | 11/2014 | Zhu | G01W 1/00 |
| | | | 702/3 |

* cited by examiner

OVERHEAD OBJECT DETECTION USING OPTICAL MEASUREMENTS

RELATED APPLICATIONS

The present application claims priority to U.S. Provisional Patent Application No. 62/171,854, filed Jun. 5, 2015, the entire specification of which is hereby incorporated by reference in its entirety for all purposes.

BACKGROUND

A pilot vehicle, or an escort vehicle, is a vehicle that accompanies an oversize load through a specified area. The pilot vehicle can have flags, signs, lights, etc. to warn the public that an oversize load is coming through the specified area. The oversize load can exceed a standard or ordinary legal size and/or weight limits for a specified portion of road, highway or other transport infrastructure. Non-limiting examples of oversize loads can include construction machines, pre-built homes, or construction elements (e.g., bridge beams, generators, windmill propellers, rocket stages). The pilot vehicle can be in front of the oversize load or behind the oversize load. In some cases, depending on the size of the load, a first pilot vehicle can be in front of the oversize load and a second pilot vehicle can be behind the oversize load.

Each geographical region (e.g., state) can have different rules and regulations for pilot vehicles with respect to oversize loads. For example, some states define any load that is over 102 inches in width and/or over 13 feet in height as "oversize," and therefore, a permit is required to transport the oversize load and/or a pilot vehicle is to accompany the oversize load at all times. Some states expect transporters to complete route surveys prior to permit submittal, depending on the size of the potential oversize load. These route surveys may or may not be conducted by the pilot vehicle. In some states, such as Utah, Washington, New York and Florida, the pilot vehicle is to be certified by the state. In Pennsylvania, the pilot vehicle is to satisfy certain insurance requirements. In addition, the regulations can require the pilot vehicle to have specific equipment, such as flags, flashing lights, cones, orange vests and other safety equipment.

In one example, the load can be above a certain height. In this situation, some states require a special pilot vehicle to accompany the load, which is referred to as a height pole vehicle. This type of pilot vehicle can include a telescopic pole that is attached to the pilot vehicle. The height of the telescopic pole can be adjusted based on a desired height for that particular load. In general, these types of pilot vehicles can be required if the load's height is greater than 17 feet. However, some states, such as New York, require these types of pilot vehicles at lower measurements, such as 14 feet and 6 inches. In addition, pilot vehicles can be required for load heights of 13 feet and 9 inches in Virginia, 14 feet in Michigan, 15 feet and 9 inches in Oklahoma, 16 feet in Utah and 17 feet in Texas. The telescopic pole attached to the pilot vehicle can ensure that the load's height does not collide with tunnels, bridges, and other physical objects that are above the road. In some situations, utility companies and state governments can measure the height of overhead items to maintain an inventory of these overhead items.

DETAILED DESCRIPTION

Technology is described for determining a height of an overhead object using optical measurements. The optical measurements can be taken via a height pole detection device that is installed on a vehicle, such as a pilot vehicle. As the vehicle moves along the road, the height pole detection device can determine the height of overhead objects or overhead surfaces that are directly above the vehicle's path. The height pole detection device can include a laser that emits a plurality of light pulses (also referred to as laser light pulses). The laser can be directed at approximately 90 degrees towards the sky (e.g., straight up or perpendicular to the road). In some cases, the laser can be directed at approximately 1-2 degrees greater than 90 degrees or approximately 1-2 degrees less than 90 degrees. The height pole detection device can also include a laser light detector, such as a photodetector. For example, as the vehicle moves along the road, the laser can emit the plurality of light pulses. If there are no overhead objects directly above the vehicle, then the light pulses can travel towards the sky. If there is an overhead object directly above the vehicle, then the light pulses can be reflected from the overhead object and subsequently detected at the laser light detector. The height pole detection device can calculate, via one or more processors, the amount of time for the light pulse to be emitted from the laser, reflect off of the overhead object, and then be detected at the laser light detector. In other words, the height pole detection device can utilize the optical measurements to calculate the amount of time associated with the light's path. The height pole detection device can determine the height of the overhead object based on the amount of time and a speed of light constant. As a result, the vehicle can determine the height of overhead objects when moving along the road. As a result, the height of overhead objects can be determined in real-time without post processing of the optical measurements.

Figure 1:
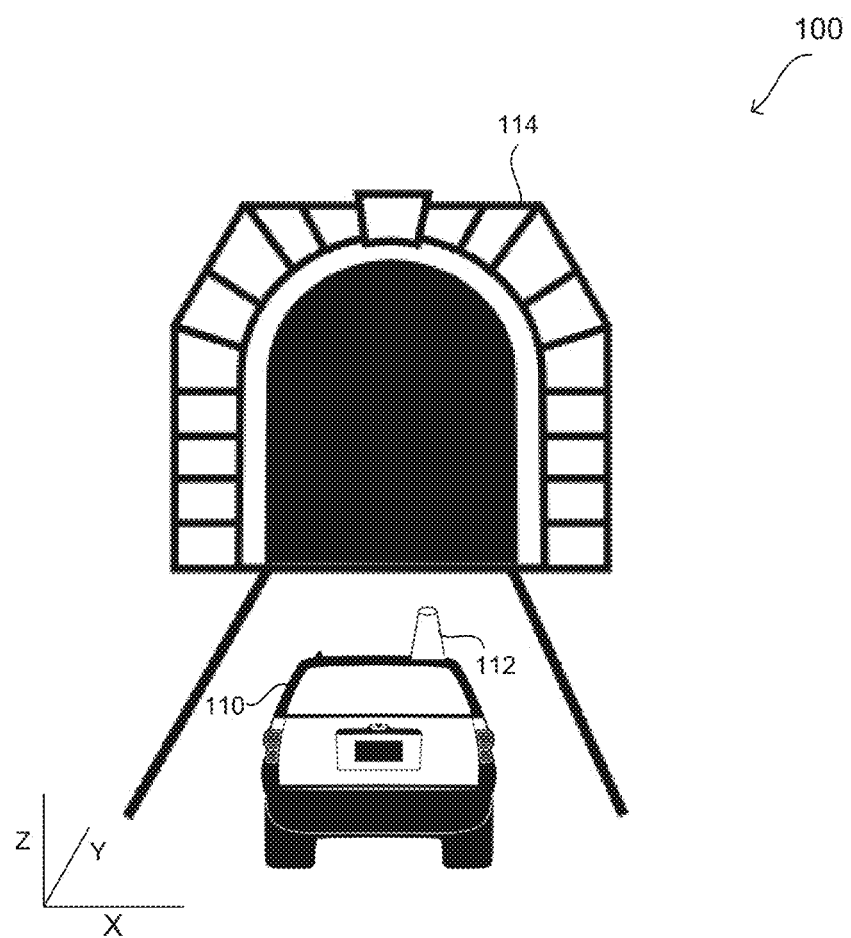
FIG. 1 illustrates a system for taking optical measurements of overhead objects from a vehicle according to an example of the present technology.

FIG. 1 illustrates a system 100 for taking optical measurements of overhead objects 114 from a vehicle 110, such as a pilot vehicle. The vehicle 110 can be traveling along a road in front of an oversize load. As non-limiting examples, the oversize load can include bridge beams, generators, windmill propellers, rocket stages, etc. The oversize load can be a defined height (e.g., 18 feet). In one example, the oversize load can be transported via a semi-trailer truck or another vehicle capable of transporting the oversize load, and the vehicle 110 can travel in front of the semi-trailer truck that is carrying the oversize load. As the vehicle 110 drives ahead of the semi-trailer truck, the vehicle 110 can determine the height of overhead objects 114. The overhead objects 114 can include an overhead bridge, tunnel, telephone wires, electrical wires, trees, and other structures. The vehicle 110 can detect if the height of the overhead object 114 is less than the height of the oversize load, and if so, the vehicle 110 can send a warning to the semi-trailer truck to take an alternative route. Therefore, the vehicle 110 can ensure that the height of the oversize load does not cause a collision between the semi-trailer truck that is carrying the oversize load and the overhead object 114.

In an alternative configuration, the vehicle 110 can perform the optical measurements, as well as transport the oversize load. In other words, the same vehicle 110 can transport the oversize load and perform the optical measurements. In this configuration, the vehicle can measure the height of the overhead structure before the vehicle drives under the overhead structure.

In one configuration, the height of the overhead objects 114 can be determined using a height pole detection device 112 that is installed on the vehicle 110. The height pole detection device 112 can include a laser, a laser light detector (e.g., a photodetector) and a solar filter. In one embodiment, the solar filter can comprise an enclosure with an optical absorbing material that partially surrounds the laser light detector and/or the laser. The enclosure may be comprised of one or more sections, such as a housing and a second enclosure coupled to the housing. Alternatively, a single enclosure may be used.

As the vehicle 110 travels along the road, the laser can emit the plurality of light pulses. In one example, the laser can scan at a rate of 30,000 cycles per second (or 30 kHz). The cycles per second can also be characterized in terms of pulse repetition frequency (PRF), which is the number of pulses of a repeating light pulse in a specific time unit. The PRF can be measured in pulses per second. In this case, the laser can emit the plurality of light pulses at a rate of 30,000 pulses per second. This is not intended to be limiting. A scan rate of 5,000 cycles per second to 90,000 cycles per second may be used, based on the dimensions of overhead objects that are to be detected, and the speed of the vehicle to which the height pole detection device 112 will be mounted.

In one example, the laser can dynamically adjust the number of cycles per second (or pulses per second), such that the number of cycles per second is sufficient to accurately detect overhead objects at desired heights when the vehicle 110 travels at a defined speed. For example, the scan rate for the laser can be set to 30,000 pulses per second when the vehicle 110 travels at 50 miles per hour, but the scan rate for the laser can be modified to 40,000 pulses per second when the vehicle 110 is traveling at 70 miles per hour. The increased scan rate can lead to increased accuracy when detecting the heights of the overhead objects. In addition, the increased scan rate can enable the height pole detection device 112 to detect increased heights of overhead objects when traveling at increased speeds. Therefore, the scan rate of the laser can vary based on the speed of the vehicle 110 and a desired height of the overhead objects to be detected (e.g., the scan rate can be increased to detect heights of up to 100 feet instead of 80 feet when traveling at 80 miles per hour).

In an alternative configuration, the laser can emit a continuous beam, as opposed to scanning at a plurality of cycles per second. In one example, the laser can be a class 1 laser that is safe under all conditions of normal use, as well as Federal Aviation Administration (FAA) approved. This allows the laser to be used without the need for specialized protective eyewear, or a danger of illuminating a person above the laser, such as a person on a bridge or in an airplane. In one configuration, the laser can be a 600 to 1000 nanometer (nm) laser, which is commonly used for non-scientific purposes. Since light at this wavelength can be focused and absorbed by the eye, the maximum power can be limited to make the laser eye-safe.

The plurality of light pulses emitted from the laser can be directed towards the sky. In one example, the light pulses can be directed immediately above the vehicle 110 at a 90 degree angle (i.e., straight up). The light pulses can be formed using laser light from substantially any portion of the spectrum, from ultraviolet light, to visible light, to near infrared light. If there is no overhead object 114 directly above the vehicle 110, then the light pulses can be directed towards the sky and into the atmosphere. If there is an overhead object 114 directly above the vehicle 110, then the light pulses may strike the overhead object 114 and be reflected off of the overhead object 114.

The laser light detector in the height pole detection device 112 can detect the light pulses that are reflected from the overhead object 114. The laser light detector can utilize photodetector technologies, such as solid state photodetectors (e.g., silicon avalanche photodiodes) or photomultipliers. In one embodiment, the laser can emit a single frequency. The photodetectors can be configured to detect that frequency. In contrast with LIDAR, which uses lasers that change in frequency, the emission and detection of a single frequency can be relatively inexpensive and substantially less complex.

The amount of laser light that is reflected off a relatively small surface, at a relatively great distance, can be very small. For example, a wire with a thickness of ¼ inch may be located 20, 50, 100 or more feet above the detector. The laser light spreads quadratically as it travels from the source. The reflected light can be directed in multiple directions. Accordingly, the percentage of the initial light that is reflected back to the detector can be substantially smaller than the transmitted light. The undesired light from external light sources can cause interference when the laser light detector is attempting to measure the reflected light from the overhead object 114. The detection of the reflected light, while using the height pole detection device in an outdoor environment can be challenging. Filters used to reduce the amount of external light at the laser light detector can also cause reflections of the laser light. Reflected laser light from the filters can be orders of magnitude brighter than reflected laser light from an overhead surface.

In accordance with an embodiment of the present technology, an enclosure that partially surrounds the laser and laser light detector can be used as an optical filter to substantially reduce the amount of unwanted light from external sources that is detectable at the laser light detector. In one embodiment, the enclosure can be a tube, although enclosures of other shapes can be used as well. The tube can ensure that the light detected at the laser light detector is reflected light (i.e., light that originates from the laser), as opposed to light from other sources. In addition, the enclosure can be configured to reduce the amount of reflected light from the laser that is received at the laser light detector. In one example, the tube can include a liner composed of an optical absorbing material (e.g., a liner can be placed inside the tube). The liner can absorb reflective and refractive light, thereby preventing the reflective and refractive light from impacting or interfering with the laser and/or the laser light detector. In one example, the optical absorbing material can be a black velvet material, or a material with a black painted finish. The optical absorbing material can also be referred to as a light absorbing (or black out) material. In one example, the enclosure can be in accordance with a defined width. The defined width of the enclosure can be reduced in order to reduce an amount of ambient light that is detected at the laser light detector.

Alternatively, the laser and the laser light detector may not include an enclosure that acts as an optical filter to substantially reduce the amount of sunlight. For example, the enclosure may not be included when the laser is used primarily at night to measure the height of overhead objects. In addition, a laser operating at certain wavelengths at which sunlight is absorbed in the atmosphere may not need sunlight filtering at the sensor. This will be explained more fully in the proceeding paragraphs.

In one configuration, the height pole detection device 112 can be enclosed in a housing, such as a tube of a predefined length that partially surrounds the laser light detector. The tube or housing can function to minimize the amount of external light from other light sources than the laser that are detectable at the laser light detector (e.g., from the Sun, street lights, car lights, or other light sources or reflective surfaces). The tube can be composed of any suitable material, such as aluminum, wood, steel or plastic. In one example, the tube can be an open-air tube, with an opening that allows the laser to be emitted substantially unimpeded towards the sky. The tube can reduce the amount of undesired light (i.e. light other than laser light reflected off of an overhead object) that is detected at the laser light detector.

In another embodiment, a second enclosure can be coupled to the housing. The laser and laser light detector can be located near a top of the housing. The second enclosure can be configured to minimize the amount of external light sources that are detectable within the housing at the laser light detector. The second enclosure can have an opening (i.e. a diameter or width) that is sufficiently large to allow the reflected laser light to enter the second enclosure while traveling at a predetermined speed in a direction substantially orthogonal to the direction of the laser beam.

For example, the vehicle 110 can be traveling in the Y direction, relative to an X, Y, Z plane. The laser light can be emitted from the height pole detection device 112 in a Z direction, substantially orthogonal to the Y direction. The size of the opening of the second enclosure can be selected to allow a sufficient amount of the reflected light from the overhead object 114 to enter the housing and to be detected at the laser light detector, while minimizing the amount of light from external light sources in an outdoor environment, as previously discussed.

In one example, the second enclosure can be a tube that is approximately 24 inches long and approximately 3 inches wide. In some cases, the length and width of the tube can be variable and can depend on the mounting location. For example, the length of the tube can be affected by chrome on the vehicle 110, and therefore, the length can be longer or shorter than 24 inches. In another example, the width of the tube can be less than 3 inches in order to reduce the amount of sunlight that travels through the enclosure to the detector. The enclosure dimensions can be selected to substantially reduce external light that is not directly overhead from being detectable at the laser light detector. In addition, by lining or coating the interior surface of the second enclosure (or first enclosure) with the optically absorbing material, light entering the second enclosure at an angle relative to the laser beam will be caused to bounce multiple times off of the interior surface before arriving at the laser light detector. The optically absorbing material can substantially absorb the external light that enters at an angle that is not substantially parallel with the laser beam exiting the second enclosure. By selecting a desired length, such as greater than 6 inches in length, the geometry of the enclosure becomes such that very few light sources are located in a plane directly above the laser light detector, and therefore capable of emitting light that can directly impinge on the detector. This example is not intended to be limiting. Enclosures of different lengths and sizes can be used to reduce the amount of unwanted light to a desired level.

The actual length of the second enclosure and the size of the opening are dependent on the strength of the laser and the frequency of the laser light relative to the frequency of the external light sources. The use of a relatively high power laser can improve the amount of light that is detected. However, as previously discussed, the use of high power lasers can also result in potential physical harm to users, bystanders, airplanes, and so forth. Accordingly, a relatively low power laser is needed.

The use of a laser ranging system is significantly better than a sonar ranging system, since light travels approximately 874,000 times faster than sound. In one example, when the height pole detection device is mounted on a vehicle traveling approximately 120 feet per second (80 MPH), the vehicle will move approximately 0.0003 inches during the time in which a laser pulse travels a round trip distance of 200 feet. In contrast, with a sonar system, the vehicle would move approximately 22 feet. Thus, it would not be possible to use sonar on a relatively fast moving vehicle to measure overhead distances. By the time the sound wave traveled from the vehicle, up 100 feet, and was reflected back down, the vehicle would be out of range to receive the reflected signal. In addition, sonar can also have difficulty measuring small areas, such as a ¼ inch wide cable due to the relatively low power and long wavelengths. Similarly, it can be difficult to receive accurate information of a small area, such as the ¼ inch wide cable, using radar since the wavelength of the radar is around 15-30 centimeters, much longer than the ¼ inch (0.64 cm) wide cable. Accordingly, the use of laser light offers significant advantages over sonar and radar.

Figure 2:
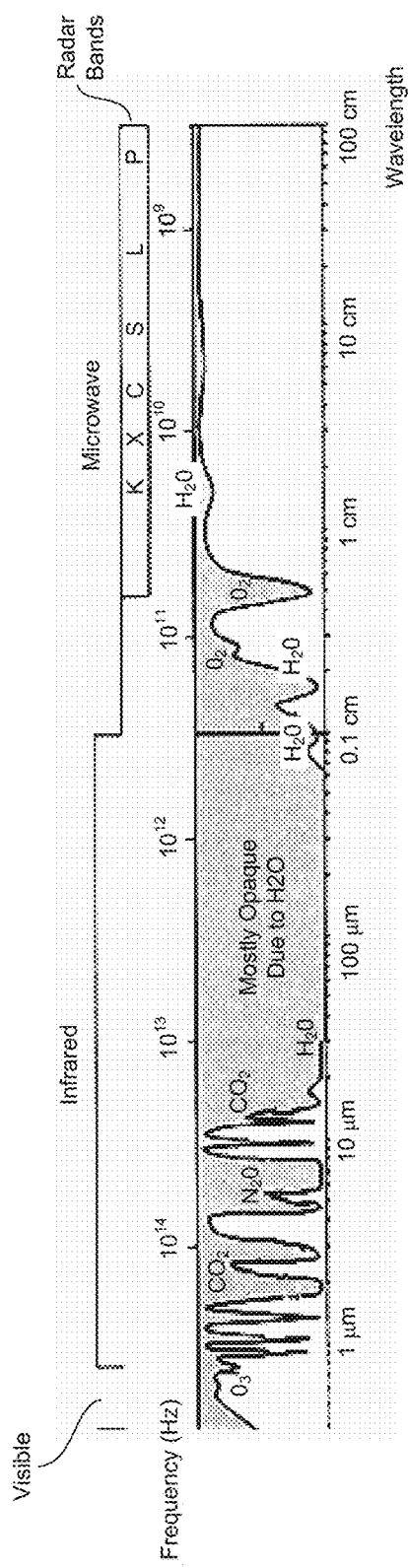
FIG. 2 illustrates a diagram showing the absorption of electromagnetic energy of various frequencies in the atmosphere according to an example of the present technology.

Another mechanism for increasing the amount of detectable laser light reflected from an overhead surface to the laser light detector, relative to unwanted light, is to select a wavelength of the laser light. During daylight operation, one of the main components of unwanted light will be from the sun. As shown in FIG. 2, the atmosphere has varying degrees of opaqueness to different wavelengths of light. In the near-infrared range, liquid water has absorption bands around 1950 nanometers (nm), 1450 nm, 1200 nm and 970 nm. Using a laser that operates at a wavelength near one of these absorption bands can substantially reduce the amount of sunlight that penetrates the atmosphere and enters the second enclosure or housing. This effectively increases the ratio of reflected laser light at the detector relative to sunlight. Other wavelengths of laser light may be selected to be optimal when operating the height pole detection device at night. For example, a wavelength can be selected that is minimally emitted by city lights, such as lights on underpasses, freeways, streets, and parking lots.

In one configuration, the height pole detection device 112 can calculate, via one or more processors, an amount of time between a light pulse transmission from the laser and a light pulse reception at the laser light detector. In other words, the height pole detection device 112 can calculate the amount of time for the light pulse to hit the overhead object, and reflect back to the laser light detector. Based on the amount of time and the speed of light (i.e., $3\times10^8$ meters per second), the distance between the height pole detection device 112 and the overhead object 114 can be calculated. The height pole detection device 112 can be at a known height from the ground (e.g., four feet), so based on the known height of the height pole detection device 112 and the distance between the height pole detection device 112 and the overhead object 114, the height of the overhead object 114 from the ground (e.g., 20 feet) can be determined. Each time the vehicle 110 travels underneath an overhead object 114, such as an overhead bridge or other structure, the height pole detection device 112 can calculate the height of the overhead object 114 from the ground. Therefore, the present technology can effectively measure the height of overhead structures along a road as the vehicle 110 travels along the road.

In one example, the height pole detection device 112 can accurately determine the height of overhead objects when the vehicle 110 travels at a defined speed (e.g., 65 miles per hour). When the vehicle 110 is traveling at highway speeds (e.g., 65 mph), the height pole detection device 112 can be capable of measuring overhead objects as small as a quarter inch in diameter (e.g., a ¼ inch wide telephone line), and the overhead objects can be up to approximately 102 feet in height (±1 inch). If the vehicle 110 is traveling at less than highway speeds (e.g., 25 miles per hour), then the height pole detection device 112 can measure overhead objects that are smaller than a quarter inch in diameter and/or greater than approximately 102 feet in height. If the vehicle 110 is traveling at greater than highway speeds (e.g., 80 miles per hour), then the height pole detection device 112 can only measure overhead objects that are greater than a quarter inch in diameter and/or less than approximately 102 feet in height. In one example, if the vehicle 110 is traveling at highway speeds and the laser in the height pole detection device 112 operates at 30 kHz, then the laser can emit approximately four light pulses and four subsequent light pulse reflections can be detected at the laser light detector when measuring an overhead object that is approximately a quarter inch in diameter. To detect overhead objects with smaller dimensions, a faster sampling rate can be used.

In one example, the vehicle 110 can be traveling in front of an oversize load of a defined height (e.g., 20 feet tall). For example, the vehicle 110 can be traveling 4 to 10 miles in front of the oversize load. The height pole detection device 112 can be connected to a computing device that can receive information from the laser light detector to detect the height of overhead objects 114 as the vehicle 110 travels along the road. The height pole detection device 112 can compare, via one or more processors of the computing device, the heights of the overhead objects 114 to a predefined height set by a user. For example, the height pole detection device 112 can compare the heights of the overhead objects 114 to the defined height associated with the oversize load (e.g., 20 feet), or the load plus a desired clearance, such as six inches. If the height pole detection device 112 detects that the overhead object 114 has a height that is less than the defined height associated with the oversize load, plus the clearance (e.g., 20.5 feet), then an alert or notification can be generated. In other words, the alert can be generated when the defined height associated with the oversize load is greater than the height of the overhead object 114, which would result in a collision between the oversize load and the overhead object 114.

In one example, the height pole detection device 112 installed on the vehicle 110 can include a transceiver with a baseband processor, which can be configured to send the alert to a computing device, such as a pager, phone, tablet, or laptop, in proximity to the oversize load (e.g., a computing device of a driver/passenger in the semi-trailer truck that is transporting the oversize load). Alternatively, the computing device can include a wireless communication system, or be in communication with a wireless communication system that can communicate an alert. The alert can be wirelessly communicated to the computing device when the vehicle 110 is traveling in front of the semi-trailer truck that is transporting the oversize load. In another example, the height pole detection device 112 can operate to set off or trigger an alarm in the semi-trailer truck (or another type of vehicle) that is part of the convoy. The alert can indicate that an upcoming overhead object 114 on the road is shorter than the oversize load's height. The alert can include a specific geographical location associated with the upcoming overhead object 114. Based on the alert received at the computing device, the driver of the semi-trailer truck can take an alternative route to avoid hitting that particular overhead object 114.

In one configuration, the vehicle 110 may not be traveling in front of the semi-trailer truck that is transporting the oversize load, but rather is surveying or mapping a defined route for a particular oversize load. The defined route can be potentially used to transport the oversize load at a later time, so the vehicle 110 can drive along the defined route and detect overhead objects that are above a predefined height. The predefined height can be associated with the oversize load that is to be transported at the later time. The computing device can include, or be in communication with, global position system (GPS). Each height measurement by the height pole detection device 112 and/or alert can be associated with a geographic location from the GPS. Therefore, for each overhead object 114, the height pole detection device 112 can determine a latitude and a longitude associated with the overhead object 114. Each of the overhead objects of a certain height and their associated GPS coordinates can be stored in a database. In addition, software can enable a user to enter comments that describe or identify the overhead object. These comments can also be stored in the database. In one example, the height pole detection device 112 can create a map of the defined route that indicates the geographical locations for each of the overhead objects that are shorter than the oversize load. The map can be provided to a driver of the semi-trailer truck that is transporting the oversize load. This allows the defined route to be adjusted accordingly in order to avoid hitting overhead objects that are shorter than the oversize load.

In one configuration, the vehicle 110 can be surveying a defined route that is not specific to a particular load. The height pole detection device 112 can detect the heights for each of the overhead objects along the defined route. The computing device connected to the height pole detection device 112 can store each of the heights for the overhead objects, along with the corresponding GPS coordinates, in a database. In one example, the database can be accessed when a particular load is desired to be transported on that defined route. Based on a predefined height of the load, a determination can be made whether the defined route will work for the predefined height, or an alternative route can be used. As a non-limiting example, the database may indicate that the defined route includes overhead objects that are 15 feet and 20 feet in height. If the oversize load in question has a height of 16 feet, then the oversize load is not allowed to take the defined route, and an alternative route should be identified.

In one configuration, the database can be extended and used for asset management. For example, the height pole detection device can be used to identify a height and corresponding GPS coordinates for assets that have been located along public and private roads or other desired locations. For instance, the height and location of signs, bridges, overhead structures, cables, and so forth can be stored in a database. The location and height of each asset can then quickly be identified as needed, either on a desktop computer or a mobile computing device.

In one configuration, the height pole detection device 112 can include multiple lasers and/or emitters. The multiple lasers can be used to measure a height of an overhead surface area, i.e., a surface area above the vehicle 110. For example, the multiple lasers can be used to measure a height of the overhead surface over a selected width, such as a width of the oversize load or a width of the road on which the vehicle 110 is traveling. The multiple lasers can more effectively measure the height of the overhead surface, as opposed to a single point by a single laser. The multiple lasers can be of different wavelengths or polarizations to allow different measurements without causing interference. In addition, the height pole detection device 112 can include multiple detectors to detect the light that is reflected from the overhead surface. In one example, the height pole detection device 112 can include a scanning laser that is configured to scan over a selected angle, and then receive multiple measurements back from multiple detectors to determine a height of the surface area at a selected width or a width based on the selected angle of the scanning laser and a distance of the overhead surface area.

Figure 3:
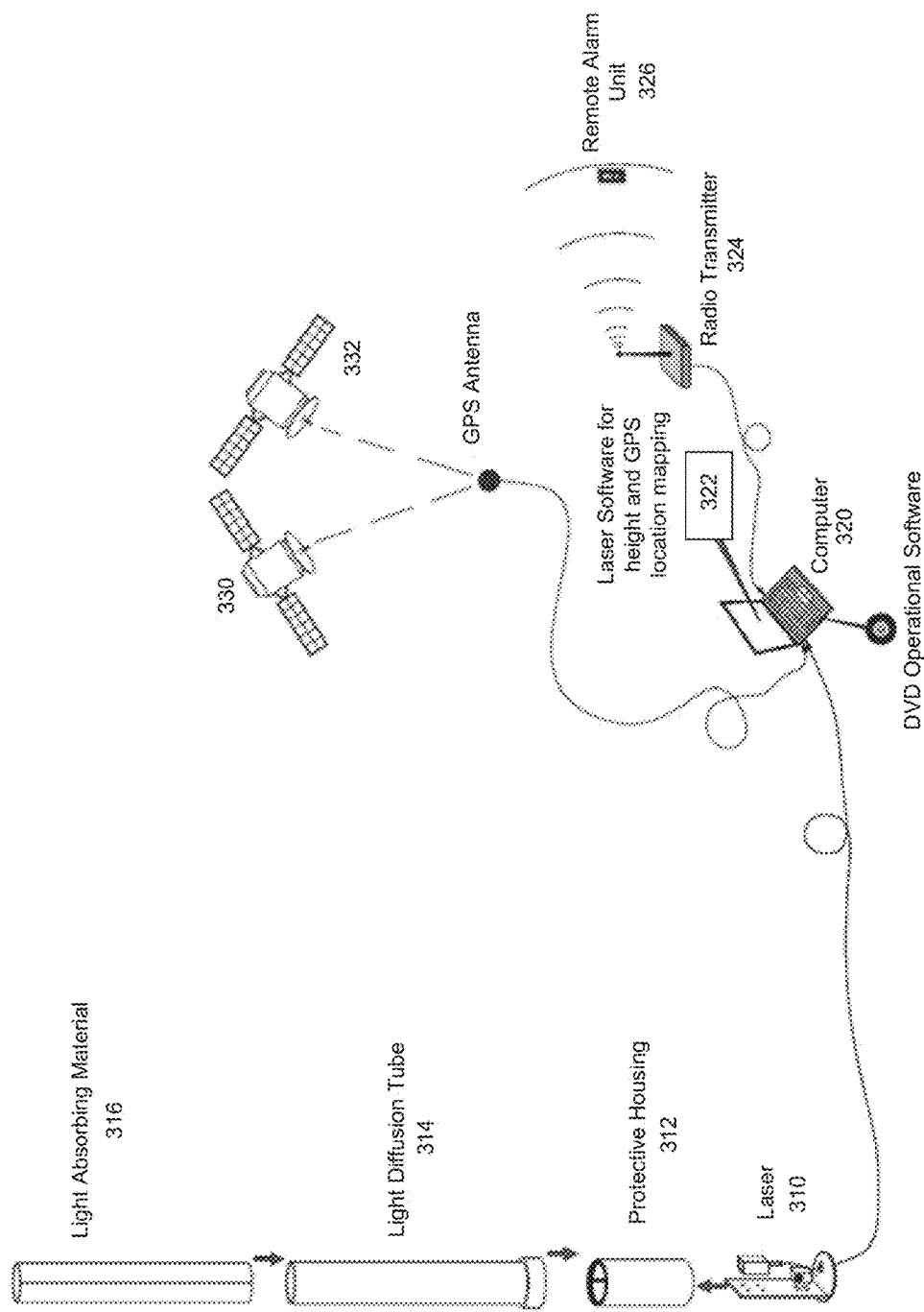
FIG. 3 illustrates a system for taking optical measurements of overhead objects from a vehicle according to an example of the present technology.

FIG. 3 illustrates an exemplary system for taking optical measurements of overhead objects from a vehicle, such as a pilot vehicle. A height pole detection device can be operable to measure the height of overhead structures along a road as the vehicle travels along the road. The height pole detection device can be mounted, for example, on top of the vehicle. The height pole detection device can include a laser 310 (with a hardware mount) that emits light pulses in the air in order to detect the height of overload structures. The height pole detection device can include a protective housing 312 that encloses the laser 310. The height pole detection device can include a light diffusion tube 314 that encloses the laser 310. The height pole detection device can include a light absorbing material 316 that covers the light diffusion tube 314. The light absorbing material 316 can be a liner that functions to absorb refractive light, thereby preventing the refractive light from impacting or interfering with the laser 310 and/or the laser light detector.

As shown in FIG. 3, the light diffusion tube 314 can surround the laser 310 used to collect optical measurements of overhead objects. In one example, the laser 310 can scan at a rate of 30,000 cycles per second (or 30 kHz). This is not intended to be limiting. A scan rate of 5,000 cycles per second to 90,000 cycles per second may be used, based on the dimensions of overhead objects that are to be detected, and the speed of the vehicle to which the height pole detection device will be mounted. The laser 310 can be a class 1 laser that is safe under all conditions of normal use (e.g., eye-safe), as well as Federal Aviation Administration (FAA) approved. In one configuration, the laser 310 can operate at a wavelength of 600 to 1000 nanometer (nm), which is commonly used for non-scientific purposes. In one example, the light diffusion tube 314 can be an open-air enclosure, such as a tube of a predetermined length that reduces the amount of undesired light that is detected at, for example, a laser light detector that is included in the height pole detection device.

The height pole detection device can be connected to a computer 320 that is onboard the vehicle. The computer 320 can execute laser software 322 for height and global positioning system (GPS) mapping. In other words, the software 322 can indicate when an overhead object that is above a defined height is detected by the height pole detection device. The computer 320 can communicate with GPS satellites 330, 332 to identify a GPS location associated with the overhead object that is above the defined height. Therefore, when the overhead object is detected, the GPS location associated with the overhead object can be automatically detected and saved in a database and/or a map. In one example, the software 322 can enable a user to enter comments that describe the overhead object. In addition, the vehicle can include a radio transmitter 324 that is operable to send a notification to a remote alarm unit 326 when the overhead object that is above the defined height is detected. The remote alarm unit 326 can be installed on another vehicle that is transporting an oversize load.

Figure 4:
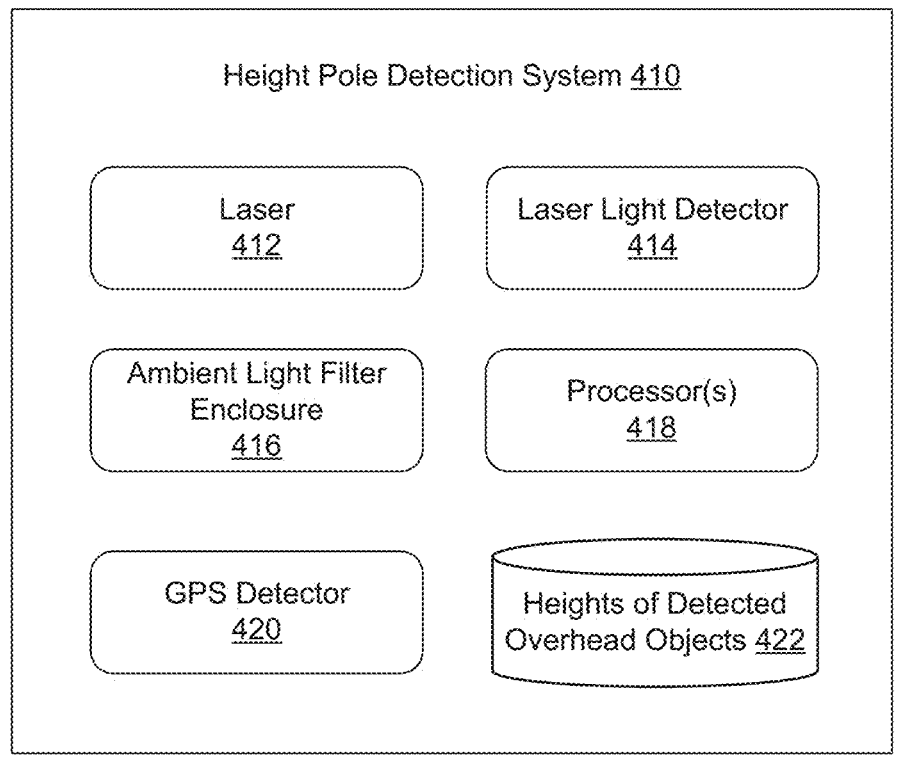
FIG. 4 illustrates a height pole detection device according to an example of the present technology.

FIG. 4 illustrates an exemplary height pole detection system 410 for detecting a height of an overhead object from a moving vehicle. The height pole detection system 410 can include a laser 412, a laser light detector 414, an ambient light filter enclosure 416 and one or more processors 418. The one or more processors 418 can be located within the ambient light filter enclosure 416. Alternatively, the one or more processors 418 can be external to the height pole detection system 410, such as within an external computing device in communication with the height pole detection system 410. The one or more processors 418 can also include a baseband processor coupled to a transceiver that can be used to communicate information between the height pole detection system 410 and an external communication device.

In one configuration, the height pole detection system 410 can be installed or mounted on a vehicle, such as a pilot vehicle, that is traveling on a defined route. The laser 412 can be operable to emit a plurality of laser light pulses substantially upwards. The laser light detector 414 can be operable to detect one or more of the laser light pulses that are emitted from the laser 412 and subsequently reflected from the overhead object that is located above the height pole detection system 410. The ambient light filter enclosure 416, such as a tube, can be operable to partially surround the laser light detector. The ambient light filter enclosure 416 can include an optical absorbing material for absorbing ambient light that is not reflected from the overhead object. The one or more processors 418 can be operable to calculate a time of flight for the laser light pulse to: travel from the laser 412 to the overhead object, reflect off of the overhead object, and be detected at the laser light detector 414. In addition, the one or more processors 418 can be operable to calculate the height of the overhead object based on the time of flight of the laser light pulse.

In one example, the one or more processors 418 of the height pole detection system 410 can be configured to: compare the height of the overhead object to a defined threshold; and generate an alert when the height of the overhead object is greater than the defined threshold. In one example, the defined threshold can be associated with a height of an oversize load that is being transported along a defined route.

In one configuration, the optical absorbing material within the ambient light filter enclosure 416 can prevent the ambient light that is not reflected from the overhead object from being inadvertently detected at the laser light detector 414. In addition, the one or more processors 418 can be further configured to communicate the alert to a communication device associated with a driver of the oversize load to enable a determination of an alternative route for transporting the oversize load.

In one example, the height pole detection system 410 can be installed on the moving vehicle that is traveling on a defined route at a speed of up to 80 miles per hour. In one example, the height pole detection system 410 can include a global positioning system (GPS) detector 420 to identify a geographical location for the overhead object that is located above the height pole detection system 410. In one example, the laser 412 operable to emit laser light pulses substantially upwards can be oriented at approximately a 90 degree angle relative to a driving surface to detect overhead objects. In one example, the laser 412 can emit laser light pulses at a rate of approximately 30,000 pulses per second. In one example, the one or more processors 418 can be used, in conjunction with computer memory, to store heights of detected overhead objects 422, wherein the detected overhead objects are along a defined route. In one non-limiting example, the height pole detection system 410 can detect overhead objects that are approximately 0.25 inches in diameter and up to approximately 100 feet in height when traveling at a speed of up to 80 miles per hour.

Figure 5:
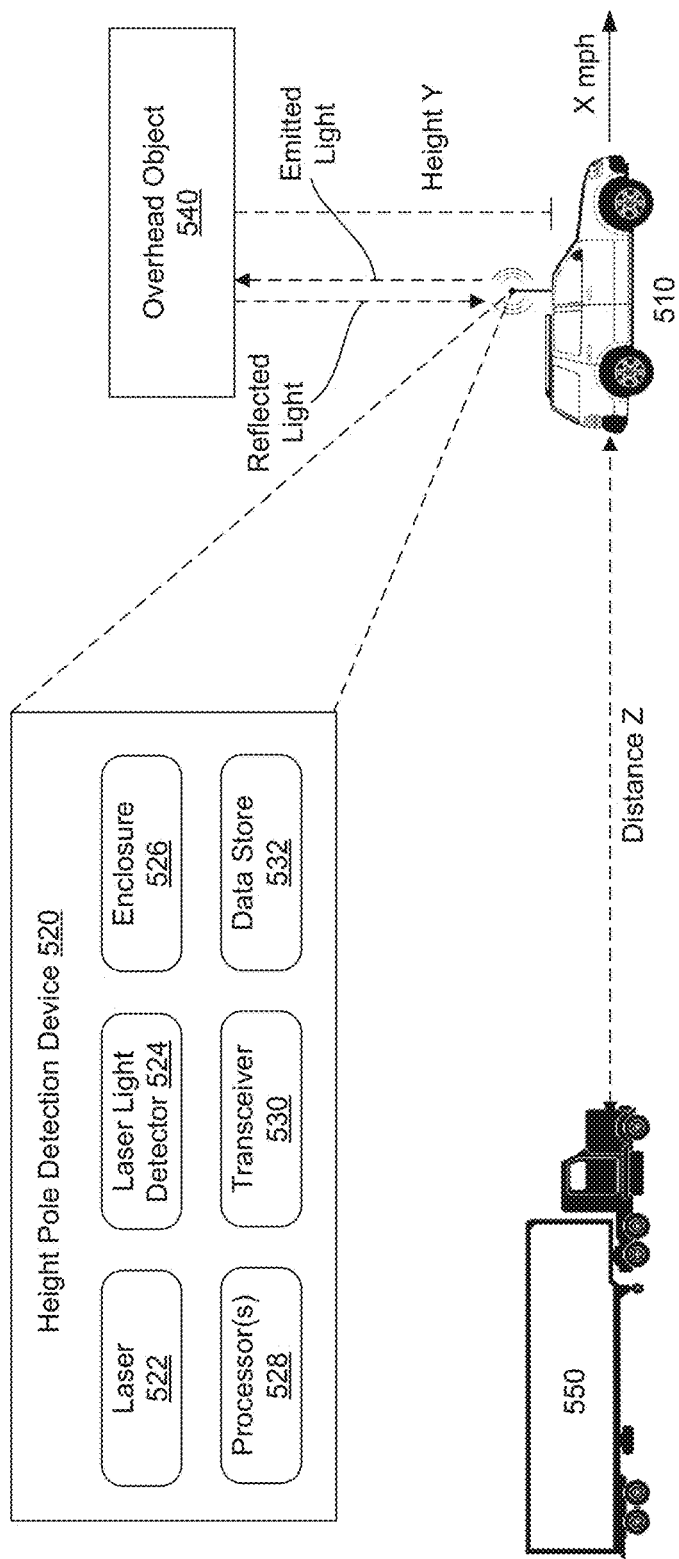
FIG. 5 illustrates a height pole detection device onboard a first vehicle that is operable to detect a height of overhead objects according to an example of the present technology.

FIG. 5 illustrates an exemplary height pole detection device 520 operable to be mounted on a first vehicle 510. The height pole detection device 520 can detect a height of an overhead object 540 relative to the first vehicle 510. The height pole detection device 520 can include a laser 522 operable to emit a plurality of laser light pulses substantially upwards. The height pole detection device 520 can include a laser light detector 524 operable to detect one or more of the plurality of laser light pulses that are emitted from the laser 522 and subsequently reflected from the overhead object 540. The height pole detection device 520 can include an enclosure 526 (e.g., a tube or an ambient light filter enclosure) operable to partially surround the laser light detector 524. The enclosure 526 can include an optical absorbing material for absorbing ambient light that is not reflected from the overhead object 540. In one example, the laser 522 and the laser light detector 524 can be configured to communicate with at least one processor 528 operable to: calculate a time of flight for the laser light pulse to: travel from the laser 522 to the overhead object 540, reflect off of the overhead object 540, and be detected at the laser light detector 524. In addition, the at least one processor 528 can calculate the height of the overhead object 540 based on the time of flight of the laser light pulse.

In one example, the at least one processor 528 is further operable to: compare the height of the overhead object 540 to a defined threshold; and generate an alert when the height of the overhead object 540 is above the defined threshold.

In one example, the height pole detection device 520 can include a transceiver 530 operable to send the alert to a second vehicle 550 when the height of the overhead object 540 is above the defined threshold. The second vehicle 550 can be configured to travel at a defined distance behind the first vehicle 510 along a defined route.

In one example, the height pole detection device 520 can include a data store 532 operable to store heights for a plurality of overhead objects along a defined route. As a non-limiting example, the height pole detection device 520 can be onboard the first vehicle 510 that is traveling at up to 80 miles per hour.

As previously discussed, the height pole detection device 520 can be used to associate a height and a GPS coordinate for specific assets that are located on public or private roads, airports, and other types of thoroughfares. The data store 532 can be used to store a height, GPS location, and asset identifier. The height can be determined and logged using the height pole detection device 520. In one embodiment, the GPS location of an asset can be determined using a GPS to identify a location of a device associated with a height measurement. Alternatively, a GPS location of an asset may be previously known and stored in the data store 532. When a height measurement is made at a selected GPS location, the height can be added to or updated in a data store for an asset having the approximate GPS location where the height measurement is made. The ability to drive with the flow of traffic at traffic speeds, even on freeways, and measure and record asset heights and locations is a significant improvement. The height pole detection device can be used by public transportation departments, as well as public and private industries including, but not limited to, power companies, telephone companies, cable television companies, fiber optic and internet companies, and other companies that distribute infrastructure above or adjacent to roads and other types of thoroughfares.

In addition, the height pole detection device 520 can also be used in other types of thoroughfares, including, but not limited to, rivers, canals, oceans, seas, and other types of waterways. Many types of waterways are covered by bridges and other overhead structures. As the height of the water changes due to rain, drought, changes in tide, and so forth, the height of an overhead structure relative to the water changes. The height pole detection device can be mounted at a known height above the water and used to determine a height of the overhead structure in real time. For instance, the height of overhead structures may be updated several times per day by boats with height pole detection devices operating on a waterway. In addition, a lead boat can be used to determine heights for other boats or barges to ensure that sufficient height clearance exists.

Figure 6:
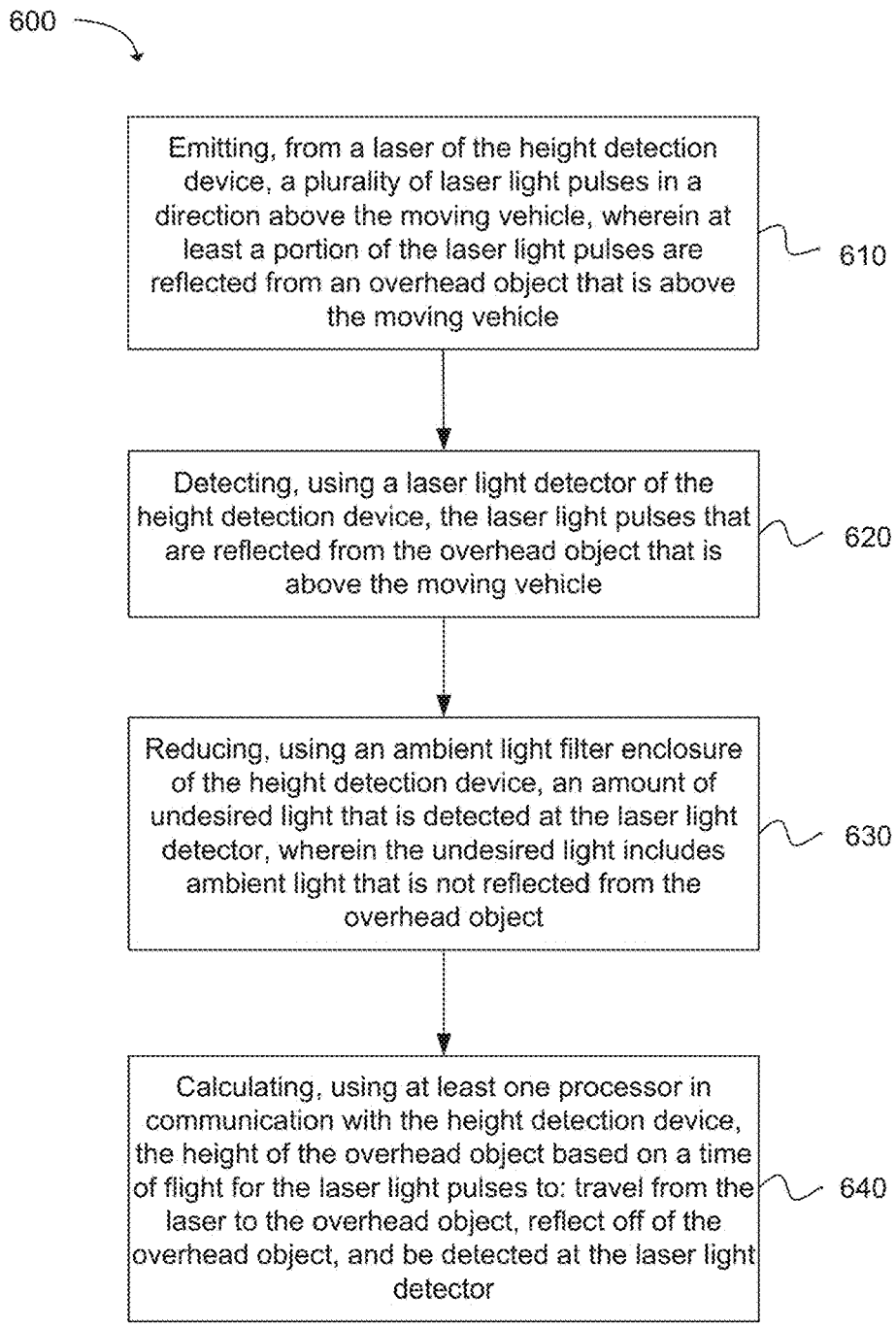
FIG. 6 is a flow chart of a method for detecting a height of overhead objects using a height detection device that is installed onboard a moving vehicle according to an example of the present technology.

FIG. 6 is an exemplary flow chart of a method 600 for detecting a height of overhead objects using a height detection device that is mounted on a moving vehicle. The method 600 can include the operation of emitting, from a laser of the height detection device, a plurality of laser light pulses in a direction above the moving vehicle, wherein at least a portion of the laser light pulses are reflected from an overhead object that is above the moving vehicle, as in block 610. The method 600 can include the operation of detecting, using a laser light detector of the height detection device, the laser light pulses that are reflected from the overhead object that is above the moving vehicle, as in block 620. The method 600 can include the operation of reducing, using an ambient light filter enclosure of the height detection device, an amount of undesired light that is detected at the laser light detector, wherein the undesired light includes ambient light that is not reflected from the overhead object, as in block 630. The method 600 can include the operation of calculating, using at least one processor in communication with the height detection device, the height of the overhead object based on a time of flight for the laser light pulses to: travel from the laser to the overhead object, reflect off of the overhead object, and be detected at the laser light detector, as in block 640.

In one configuration, the method 600 can further include the operations of: comparing, using the at least one processor in communication with the height detection device, the height of the overhead object to a defined threshold, wherein the defined threshold is associated with a height of an oversize load to be transported along a defined route; generating, using the at least one processor of the height detection device, an alert when the height of the overhead object is above the defined threshold; and communicating, using a transceiver of the height detection device, the alert to a communication device associated with a driver that will transport the oversize load along the defined route.

In one configuration, the method 600 can include the operation of creating a map of overhead objects along a defined route and a corresponding height for each overhead object. The map can indicate a geographical location for each detected overhead object using a global positioning system (GPS) detector of the height detection device. The map can enable drivers to transport overhead objects along the defined route. In one example, the laser light pulses are emitted from the laser in accordance with a sampling rate that is sufficient to accurately detect overhead objects at desired heights when the moving vehicle travels at a desired speed.

Figure 7:
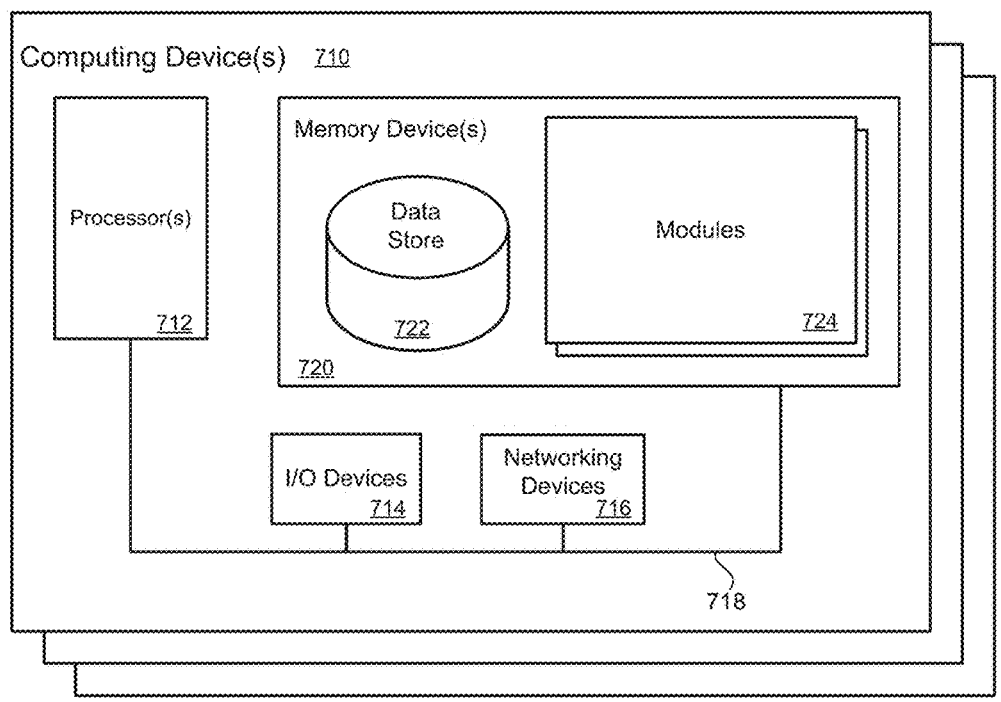
FIG. 7 is a block diagram that provides an example illustration of a computing device that may be employed in the present technology.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device may include a local communication interface 718 for the components in the computing device. For example, the local communication interface may be a local data bus and/or any related address or control busses as may be desired.

The memory device 720 may contain modules 724 that are executable by the processor(s) 712 and data for the modules 724. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. An example of an I/O device is a display screen that is available to display output from the computing devices. Other known I/O device may be used with the computing device as desired. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A height pole detection system for detecting a height of an overhead object from a moving vehicle, the height pole detection system comprising:
   a laser operable to emit a plurality of laser light pulses substantially upwards; and
   a laser light detector operable to detect one or more of the plurality of laser light pulses that are emitted from the laser and subsequently reflected from the overhead object that is located above the height pole detection system,
   wherein the laser light detector enables detection of the height of the overhead object based on a time of flight of detected laser light pulses; and
   wherein the height pole detection system is further configured to communicate information to one or more processors operable to:
   calculate the time of flight for the laser light pulse to: travel from the laser to the overhead object, reflect off of the overhead object, and be detected at the laser light detector;
   calculate the height of the overhead object based on the time of flight of the laser light pulse;
   compare the height of the overhead object to a defined threshold, wherein the defined threshold is associated with a height of an oversize load that is being transported along a defined route; and
   generate an alert when the height of the overhead object is less than the defined threshold.

2. The height pole detection system of claim 1, wherein the one or more processors are further configured to communicate the alert to a communication device associated with a driver of the oversize load to enable a determination of an alternative route for transporting the oversize load.

3. The height pole detection system of claim 1, wherein the height pole detection system is traveling on a defined route at a speed of up to 80 miles per hour.

4. The height pole detection system of claim 1, further comprising a global positioning system (GPS) detector to identify a geographical location for the overhead object that is located above the height pole detection system.

5. The height pole detection system of claim 1, wherein the laser operable to emit laser light pulses substantially upwards is oriented at approximately a 90 degree angle relative to a driving surface to detect overhead objects.

6. The height pole detection system of claim 1, wherein the laser emits the plurality of laser light pulses at a rate of approximately 30,000 pulses per second.

7. The height pole detection system of claim 1, further configured to communicate information to one or more processors operable to: store, in a database, a height for each detected overhead object along a defined route.

8. The height pole detection system of claim 1, wherein the height pole detection system is operable to detect overhead objects that are approximately 0.25 inches in diameter and up to approximately 100 feet in height when the moving vehicle is traveling at a speed of up to approximately 80 miles per hour.

9. A height pole detection device operable to be mounted on a first vehicle, the height pole detection device configured to detect a height of an overhead object relative to the first vehicle, the height pole detection device comprising:
   a laser operable to emit a plurality of laser light pulses substantially upwards;
   a laser light detector operable to detect one or more of the plurality of laser light pulses that are emitted from the laser and subsequently reflected from the overhead object; and
   an ambient light filter enclosure operable to partially surround the laser light detector, the ambient light filter enclosure including an optical absorbing material for absorbing ambient light that is not reflected from the overhead object,
   wherein the laser and the laser light detector are configured to communicate with at least one processor that is operable to:
   calculate a time of flight for a laser light pulse to: travel from the laser to the overhead object, reflect off of the overhead object, and be detected at the laser light detector;
   calculate the height of the overhead object based on the time of flight of the laser light pulse,
   compare the height of the overhead object to a defined threshold, wherein the defined threshold is associated with a height of an oversize load that is being transported along a defined route; and generate an alert when the height of the overhead object is below the defined threshold.

10. The height pole detection device of claim 9, further comprising an ambient light filter enclosure operable to partially surround the laser light detector, the ambient light filter enclosure including an optical absorbing material for absorbing ambient light that is not reflected from the overhead object.

11. The height pole detection device of claim 9, further comprising a transceiver operable to send the alert to a second vehicle when the height of the overhead object is above the defined threshold, wherein the second vehicle is configured to travel at a defined distance behind the first vehicle along a defined route.

12. The height pole detection device of claim 9, further comprising a data store operable to store heights for a plurality of overhead objects along a defined route.

13. The height pole detection device of claim 9, wherein the height pole detection device is traveling at up to 80 miles per hour.

14. The height pole detection system of claim 1, further comprising an ambient light filter enclosure operable to partially surround the laser light detector, the ambient light filter enclosure including an optical absorbing material for absorbing ambient light that is not reflected from the overhead object.

15. A method for detecting a height of an overhead object using a height detection device that is mounted on a moving vehicle, the method comprising:

emitting, from a laser of the height detection device, a plurality of laser light pulses in a direction above the moving vehicle, wherein at least a portion of the laser light pulses are reflected from an overhead object that is above the moving vehicle;

detecting, using a laser light detector of the height detection device, the laser light pulses that are reflected from the overhead object that is above the moving vehicle;

calculating, using at least one processor in communication with the height detection device, the height of the overhead object based on a time of flight for the laser light pulses to: travel from the laser to the overhead object, reflect off of the overhead object, and be detected at the laser light detector; and comparing, using the at least one processor in communication with the height detection device, the height of the overhead object to a defined threshold, wherein the defined threshold is associated with a height of an oversize load to be transported along a defined route.

16. The method of claim 15, further comprising:

generating, using the at least one processor of the height detection device, an alert when the height of the overhead object is below the defined threshold; and communicating, using a transceiver of the height detection device, the alert to a communication device associated with a driver that will transport the oversize load along the defined route.

17. The method of claim 15, further comprising creating a map of overhead objects along a defined route and a corresponding height for each overhead object, the map indicating a geographic location for each detected overhead object using a global positioning system (GPS) detector of the height detection device, wherein the map enables drivers to transport overhead objects along the defined route.

18. The method of claim 15, wherein the laser light pulses are emitted from the laser in accordance with a sampling rate that is sufficient to accurately detect overhead objects at desired heights when the moving vehicle travels at a desired speed.

19. The method of claim 15, further comprising:

reducing, using an ambient light filter enclosure of the height detection device, an amount of undesired light that is detected at the laser light detector, wherein the undesired light includes ambient light that is not reflected from the overhead object.

* * * * *